United States Patent [19]

Charlson et al.

[11] 4,414,166

[45] Nov. 8, 1983

[54] LASER JOINING OF THERMOPLASTIC AND THERMOSETTING MATERIALS

[75] Inventors: Paul M. Charlson, Longmont, Colo.; Clarence R. Schwieters; Jun H. Souk, both of Rochester, Minn.

[73] Assignee: International Business Machines Corporation, Armonk, N.Y.

[21] Appl. No.: 336,650

[22] Filed: Jan. 4, 1982

[51] Int. Cl.³ .................... B29C 23/00; B29C 27/00; B29C 9/00

[52] U.S. Cl. ...................................... 264/25; 264/249; 264/320

[58] Field of Search ............... 264/273, 274, 22, 23, 264/25, 249, 320

[56] References Cited

U.S. PATENT DOCUMENTS

| | | | |
|---|---|---|---|
| 2,052,616 | 9/1936 | Gardes | 264/249 |
| 2,335,872 | 12/1943 | Mitchell | 264/273 |
| 2,425,104 | 8/1947 | Luce | 264/249 |
| 2,431,238 | 11/1947 | Friedman | 264/249 |
| 2,931,110 | 4/1960 | Pietrocola | 264/273 |
| 3,398,222 | 8/1968 | Kaufman et al. | 264/273 |
| 3,399,018 | 8/1968 | LeBlanc | 264/249 |
| 3,595,948 | 7/1971 | Cosani | 264/249 |
| 3,627,858 | 12/1971 | Parts | 264/25 |
| 3,678,142 | 7/1972 | Dubach | 264/25 |
| 3,764,432 | 10/1973 | Bealor | 264/25 |
| 3,875,648 | 4/1975 | Bone | 264/25 |

Primary Examiner—Willard E. Hoag
Attorney, Agent, or Firm—Donald F. Voss

[57] ABSTRACT

Thermoplastic materials are joined to non-thermoplastic materials such as thermosetting materials by laser radiant energy which causes the thermoplastic material to flow onto the thermosetting material, preferably into a notch or groove or over a shoulder or lip to form a joint by mechanically locking the materials together.

6 Claims, 4 Drawing Figures

LASER JOINING OF THERMOPLASTIC AND THERMOSETTING MATERIALS

TECHNICAL FIELD

This invention relates to a method for joining a thermoplastic piece of material to a non-thermoplastic piece of material.

BACKGROUND ART

The joining of thermoplastic materials with thermosetting materials by fusion welding is not feasible because the two materials do not unite by flowing. The thermoplastic material will flow, but the thermosetting material will not flow. Hence, the two materials will not unite by welding. On the other hand it is well known to join two pieces of thermoplastic materials together by laser welding as in U.S. Pat. No. 3,989,778 for Method of Heat Sealing Thermoplastic Sheets Together Using A Split Laser Beam by R. F. Osborne.

Thermoplastic materials can; however, be joined to thermosetting materials in a short period of time using a laser as a radiant energy source and directing the beam of the laser so as to cause the thermoplastic material to flow over the thermosetting material to mechanically join the pieces of material together.

DISCLOSURE OF THE INVENTION

Thermoplastic material is joined to thermosetting material by applying radiant energy to the thermoplastic material to cause it to flow over the thermosetting material to form a mechanical joint at an interface between the two materials.

The significant features of the invention are that by using a laser as the radiant energy source, the joint can be formed in one half to five seconds. This is important when production requirements are high. Additionally the joint can be formed between parts located in a limited accessible assembly. This is possible because only the laser beam has to contact the thermoplastic material and no physical contact is required. In this latter instance it may be necessary to mold or machine the thermoplastic piece with an angular surface so as to accommodate the laser beam when the laser beam cannot be projected at the interface without first striking an edge of the thermoplastic material remote from the interface. The otherwise blocking edge can be sloped away from the interface, thereby allowing the laser beam to impinge upon the thermoplastic material at the interface.

The present invention has particular utility in joining phenolic which is a thermosetting material to polycarbonate which is a thermoplastic material. In some instances the occasion for joining these two materials arises from their differing properties. Phenolic has certain properties which are desirable for magnetic and electrical environments. On the other hand polycarbonate can be molded easily and is stable after being molded.

The occasion of inaccessibility arises in instances where prior to joining the two materials, they must be aligned relative to other parts located interiorly in an assembly. The assembly usually has a limited access hole which makes it difficult to join the two materials using methods requiring contact with the materials. The present invention, of course, because of the laser beam as the energy source, does not require physical contact with the materials.

Figure 1:
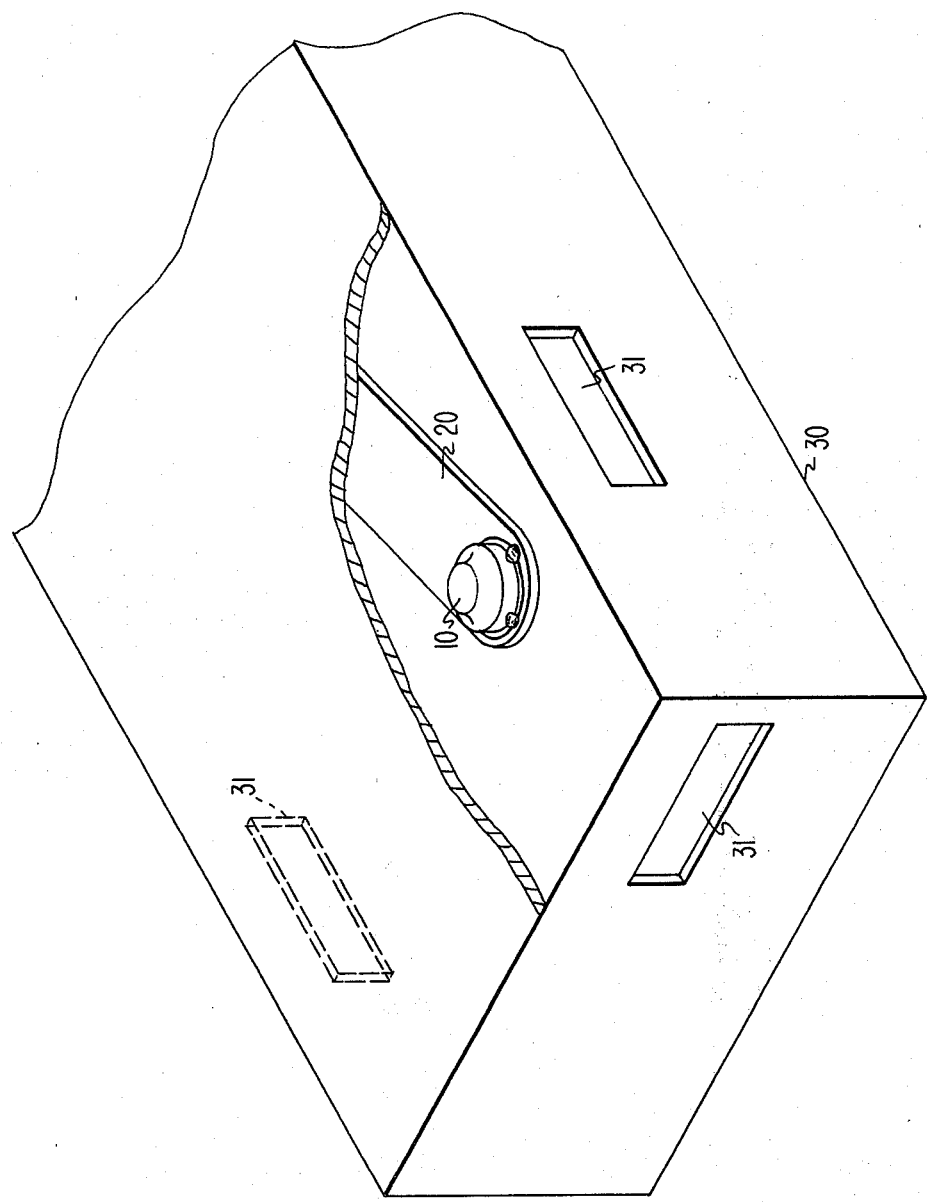
FIG. 1 is a schematic view illustrating the parts to be joined by the present invention where the parts are located within an enclosure having access holes.

The invention is illustrated in FIG. 1 as a method for joining a thermosetting part 10 to a thermoplastic part 20 after they have been aligned relative to other parts, not shown, within an enclosure 30 which has access holes or openings 31. Controlled laser beams are directed through the access holes 31 to impinge upon a shoulder or rim 21 of the thermoplastic part 20 near its interface with the thermosetting part 10 to raise the temperature of the thermoplastic part 20 at the impingement area to its flow temperature whereby thermoplastic melt flows into a gap or channel 15 formed between the two parts and over a lip or shoulder 11 on the thermosetting part 10 as more clearly illustrated in FIG. 2. The channel 15 provides additional mechanical locking of the two parts.

Figure 4:
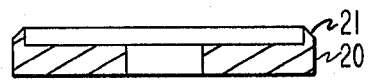
FIG. 4 is a cross sectional view of the thermoplastic part where the complementary lip is beveled away from the interface.

The joint between the thermosetting and thermoplastic parts is formed by reflowing the thermoplastic material over the thermosetting material. The beam 41 from laser 40, FIG. 2, should strike the shoulder 21 near its edge closest to channel 15. If the angle of incidence is restricted whereby the beam 41 would strike the shoulder 21 near or at the edge remote from channel 15, that edge can be beveled as in FIG. 4.

Two examples follow, setting forth the type of laser used together with specific process parameters. The process parameters can vary depending upon production requirements.

EXAMPLE 1

The thermosetting part 10 of FIG. 1 is made of phenolic material which is a thermosetting material. Part 20 to which part 10 is to be joined is a 30% medium filled glass polycarbonate material. Phenolic was used for part 10 because of its electrical properties. The 30% medium filled glass polycarbonate material was chosen for part 20 because of its ease of moldability and stability after molding. Parts 10 and 20 were joined to each other at three different areas using $1.06\mu$ radiation of a low power YAG laser with a beam impingement time of approximately 5 seconds. This produced a joining of the two parts at the three areas with a pull strength of approximately 18 pounds. The laser beam did cause some polycarbonate charring at the point where the core of the beam struck the polycarbonate but a uniform melt area was created to form a joint. A uniform melt area can be widened by defocusing the laser beam. This also minimizes the localized burning of the polycarbonate.

The beam angle of incidence was only approximately 10° from the horizontal axis. A greater angle of incidence such as a 45° angle would be preferable but in situations such as in FIG. 1 where the parts are in an enclosure the angle of incidence was restricted. It would be possible but perhaps not practical to insert mirrors into the enclosure 30 so as to increase the angle of incidence.

EMAMPLE 2

Figure 2:
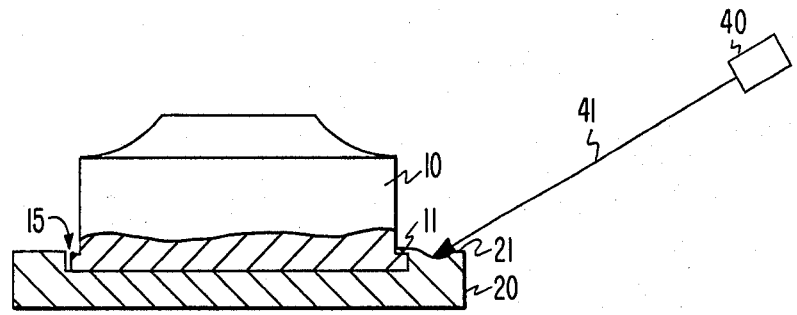
FIG. 2 is a schematic view illustrating the joint made by the invention where the thermosetting part has a lip or shoulder confronted by and spaced from a complementary lip or shoulder on the thermoplastic part.
Figure 3:
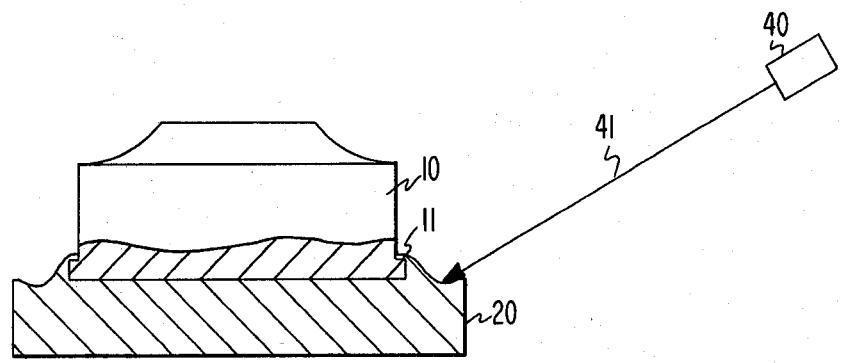
FIG. 3 is a schematic view illustrating the joint made by the invention where the thermosetting part has a lip or shoulder without a complementary lip or shoulder on the thermoplastic part.

In this example the phenolic part 10, FIG. 3, had substantially the same shape and dimensions as the part 10 of FIG. 2. The polycarbonate part 20, however, did not have a rim or shoulder 21 confronting the lip or shoulder 11 of part 10 and thus there is no gap or channel 15 as in FIG. 2. The laser used in this example was a $CO_2$ laser having 10.6 μm radiation with a cylindrical lens 0.04 by 0.40 inches focal size which extended the joining area along the interface between parts 10 and 20. The parts were joined using 40 watts with exposure times of 0.5, 1.0, and 2.0 seconds. The beam was directed at three areas producing three joints to join the parts 10 and 20 with an average pull strength of 4.2 pounds, 6.2 pounds, and 10.0 pounds corresponding to exposure times of 0.5, 1.0 and 2.0 seconds respectively. It was noted that the radiation energy from the high power $CO_2$ laser could increase the temperature of the polycarbonate so rapidly that the melt did not have enough time to reflow. Although process time can be reduced by using the $CO_2$ laser, joint strength is less than that when using the YAG laser with a longer exposure time.

Various alternatives exist for joining the thermosetting and thermoplastic parts. Assuming that the parts are to be joined at three places, three separate low power lasers can be arranged so that the beams therefrom impinge upon the three areas simultaneously. Alternatively, a single high power laser can be used together with beam splitters and mirrors to divide one high energy beam into three beams to impinge upon the three areas or a single low power laser can be used together with rotational mirrors which move the beam to the three areas successively.

From the foregoing it is seen that the present invention provides a method for joining a thermosetting part to a thermoplastic part in 5 seconds or less. It is seen that the parts can be joined without physical contact with the parts, however, it should be noted that in some instances the parts may be in an assembly where there is loading between the parts, i.e., there may be a force holding part 10 against part 20 but yet the joint is made without using an instrument which physically contacts the parts 10 and 20. It is also seen that the joint can be made even though the parts are in an enclosure and are accessible only through access holes.

We claim:

1. A method for joining thermoplastic material to thermosetting material comprising the steps of:
    forming a projection locking surface on the thermosetting material,
    causing the termoplastic material to melt and flow merely by projecting a laser beam to impinge upon the thermoplastic material at the area adjacent to said locking surface,
    the melted material flowing out of its own plane over said locking surface to form a joint at the interface between the thermosetting and thermoplastic materials.

2. The method of claim 1 where the beam is projected for about 0.5 seconds to 5 seconds.

3. The method of claim 1 where the beam is projected at an angle between 10 and 45 degrees from the horizontal axis.

4. The method of claim 1 where there are at least three locking surfaces formed on said thermosetting part and the thermoplastic material is heated in areas adjacent to said at least three locking surfaces.

5. The method of claim 1 where there is a notch between the locking surface and the thermoplastic material at the area adjacent to the locking surface.

6. The method of claim 1 where said thermoplastic material is provided with an angular surface remote from said interface to enable said laser beam to be projected upon said thermoplastic material adjacent to said interface.

* * * * *